United States Patent
Subramaniam et al.

(10) Patent No.: US 12,173,153 B2
(45) Date of Patent: Dec. 24, 2024

(54) DUAL-MOLDED POLYAMIDE-SILICONE COMPOSITE ARTICLE AND METHODS OF MAKING

(71) Applicant: 3M INNOVATIVE PROPERTIES COMPANY, St. Paul, MN (US)

(72) Inventors: Ramnath Subramaniam, North Oaks, MN (US); Joseph S. Warner, Hudson, WI (US); Michael J. Svendsen, Blaine, MN (US); David M. Castiglione, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1082 days.

(21) Appl. No.: 17/047,493

(22) PCT Filed: Apr. 16, 2019

(86) PCT No.: PCT/IB2019/053124
§ 371 (c)(1),
(2) Date: Oct. 14, 2020

(87) PCT Pub. No.: WO2019/202497
PCT Pub. Date: Oct. 24, 2019

(65) Prior Publication Data
US 2021/0147677 A1 May 20, 2021

Related U.S. Application Data

(60) Provisional application No. 62/659,299, filed on Apr. 18, 2018.

(51) Int. Cl.
*C08L 77/06* (2006.01)
*A62B 7/10* (2006.01)
(Continued)

(52) U.S. Cl.
CPC .............. *C08L 77/06* (2013.01); *A62B 9/00* (2013.01); *A62B 18/025* (2013.01); *A62B 18/08* (2013.01);
(Continued)

(58) Field of Classification Search
CPC ............ C08L 77/06; C08L 83/04; A62B 9/00; A62B 18/025; A62B 18/08; A62B 7/10;
(Continued)

(56) References Cited

U.S. PATENT DOCUMENTS

| 3,726,945 | A | * | 4/1973 | Bottenbruch | ........... | C08L 77/06 |
| | | | | | | 525/58 |
| 4,952,628 | A | * | 8/1990 | Blatz | ........................ | B32B 27/08 |
| | | | | | | 525/58 |

(Continued)

FOREIGN PATENT DOCUMENTS

WO    WO 2009/029349    3/2009

OTHER PUBLICATIONS

Boßhammer Stephan: "Self-Adhesive Liquid Silicone Rubbers (LSRs) for the Injection Molding of Rigid Flexible Combinations", Dec. 1, 2003, pp. 671-677, XP055868777, Retrieved from the Internet: URL:https://onlinelibrary.wiley.com/doi/abs/10.1002/9783527619924.ch107 [retrieved on Dec. 2, 2021].

(Continued)

*Primary Examiner* — Valerie L Woodward
(74) *Attorney, Agent, or Firm* — Kenneth B. Wood (57) ABSTRACT

A dual-molded silicone-polyamide composite article including a first molded piece that comprises a blend of polyamide and an ethylene-vinyl alcohol copolymer and a second molded piece that comprises a thermoset, hydrosilylation-cure silicone polymer. A portion of a surface of the second molded piece is autogenously bonded to a portion of a surface of the first molded piece.

19 Claims, 2 Drawing Sheets

(51) Int. Cl.
*A62B 9/00* (2006.01)
*A62B 18/02* (2006.01)
*A62B 18/08* (2006.01)
*B29C 45/16* (2006.01)
*B29K 77/00* (2006.01)
*B29K 83/00* (2006.01)
*B32B 25/08* (2006.01)
*B32B 25/14* (2006.01)
*C08L 83/04* (2006.01)

(52) U.S. Cl.
CPC .............. *B32B 25/08* (2013.01); *B32B 25/14* (2013.01); *C08L 83/04* (2013.01); *A62B 7/10* (2013.01); *B29C 45/1615* (2013.01); *B29K 2077/00* (2013.01); *B29K 2083/00* (2013.01); *B32B 2250/02* (2013.01); *B32B 2250/24* (2013.01); *B32B 2535/00* (2013.01)

(58) Field of Classification Search
CPC ......... A62B 18/04; B32B 25/08; B32B 25/14; B32B 2250/02; B32B 2250/24; B32B 2535/00; B29C 45/1615; B29C 45/0001; B29C 45/1676; B29C 45/1657; B29C 2045/1664; B29K 2077/00; B29K 2083/00; B29K 2023/086; C08G 77/12; C08G 77/20; A62D 5/00; A62D 9/00
See application file for complete search history.

(56) References Cited

U.S. PATENT DOCUMENTS

| | | | | |
|---|---|---|---|---|
| 4,990,562 | A | * | 2/1991 | Chou ..................... B32B 27/34 |
| | | | | 525/60 |
| 4,990,652 | A | | 2/1991 | King |
| 5,064,716 | A | * | 11/1991 | Chou ..................... C08L 29/04 |
| | | | | 428/433 |
| 2002/0020416 | A1 | | 2/2002 | Namey |
| 2004/0053054 | A1 | | 3/2004 | Bobovitch |
| 2005/0009987 | A1 | | 1/2005 | Hara |
| 2009/0143534 | A1 | | 6/2009 | Kawamura |
| 2010/0206311 | A1 | | 8/2010 | Flannigan |
| 2015/0128936 | A1 | * | 5/2015 | Flannigan ......... B29C 45/14311 |
| | | | | 128/201.19 |
| 2017/0191586 | A1 | | 7/2017 | Nadeau |

OTHER PUBLICATIONS

Ahn, "Binary blends if nylons with ethylene vinyl alcohol copolymers: morphological, thermal, rheological, and mechanical behavior", Polymer engineering and science, vol. 30, No. 6, pp. 341-349.
International Search report for PCT International Application No. PCT/IB2019/053124 mailed on Aug. 26, 2019, 5 pages.

* cited by examiner

DUAL-MOLDED POLYAMIDE-SILICONE COMPOSITE ARTICLE AND METHODS OF MAKING

CROSS REFERENCE TO RELATED APPLICATIONS

This application is a national stage filing under 35 U.S.C. 371 of PCT/IB2019/053124, filed Apr. 16, 2019, which claims the benefit of provisional application Ser. No. 62/659,299, filed Apr. 18, 2018, the disclosure of which is incorporated by reference in its/their entirety herein.

BACKGROUND

Components of various apparatus and devices are often molded, e.g. injection-molded. In some instances, multiple materials may be e.g. co-molded, overmolded, insert-molded, or the like, in order to product a composite article.

SUMMARY

In broad summary, herein is disclosed a dual-molded silicone-polyamide composite article including a first molded piece that comprises a blend of polyamide and an ethylene-vinyl alcohol copolymer and a second molded piece that comprises a thermoset, hydrosilylation-cure silicone polymer. A portion of a surface of the second molded piece is autogenously bonded to a portion of a surface of the first molded piece. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DETAILED DESCRIPTION

Figure 1:
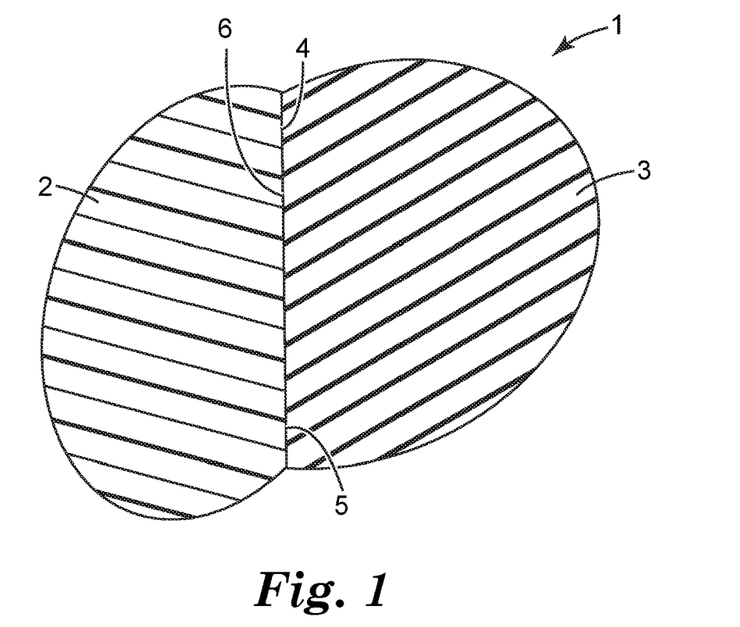
FIG. 1 is a side schematic cross sectional view of a portion of a composite article comprising first and second molded pieces that are autogeneously bonded together at an interface between the molded pieces.

Disclosed herein is a dual-molded silicone-polyamide composite article 1 comprising a first molded piece 2 and a second molded piece 3. A portion 6 of a surface of second molded piece 3 is autogenously bonded to a portion 5 of a surface of first molded piece 2, at an interface 4 between the first and second molded pieces. By a composite article is meant a structure that comprises at least two major components (i.e., first and second molded pieces 2 and 3) that are of dissimilar composition. The major components are macroscopic, discrete components (although they are bonded to each other at an interface as disclosed herein). A composite article as disclosed herein is thus distinguished from microscopically multiphase polymeric materials such as blends, filled polymeric materials, alloys, mixtures and the like (although one major component of the composite article will itself be a blend as discussed in detail herein). By a silicone-polyamide composite article is meant a structure in which first molded piece 2 is made of a polyamide blend material and in which second molded piece 3 is made of a silicone material, as discussed later herein in detail.

By autogenous bonding, autogenously bonded, and like terms, is meant that portion 6 of a surface of second molded piece 3 is bonded to portion 5 of a surface of first molded piece 4 by way of bonds (e.g., covalent bonds) between molecules of a major constituent of second piece 3 and molecules of a major constituent of first piece 2. By a major constituent of a molded piece is meant a constituent that makes up at least 5 weight percent of the molded piece and that is present throughout the molded piece (rather than being, e.g. a surface treatment or tie layer). An autogenous bond is thus a "direct" bond between surfaces of first and second molded pieces 2 and 3, and excludes for example bonding by way of an adhesive that is introduced into an interface between the first and second pieces. Also, an autogenous bond between second piece 3 and first piece 2 is one that is established during the process of molding second piece 3 while it in contact with first piece 2, as discussed in detail below.

By dual-molded is meant that first molded piece 2 is formed by introducing a first flowable precursor of first piece 2 into a molding chamber and at least partially solidifying the precursor to form first piece 2, after which a second flowable precursor of second molded piece 3 is inserted into a molding chamber so that a portion 6 of a surface of second precursor of second piece 3 comes into contact with a portion 5 of a surface of first molded piece 2 so that an autogenous bond can be established. The term dual-molding as used herein thus broadly encompasses various molding processes commonly referred to as e.g. insert molding, overmolding, co-molding, multi-component molding, multi-shot molding, and the like.

First molded piece 2 comprises polyamide. Any suitable polyamide may be used, chosen from e.g. nylon 66, nylon 6, nylon 510, nylon 16, nylon 11, and nylon 12, and any suitable copolymer, mixture or blend thereof. In some embodiments, the polyamide may comprise one or more additives, chosen for whatever purpose. Suitable additives may include e.g. mineral fillers, glass fibers or microspheres, impact modifiers, antioxidants, flame retardants, and so on, as long as the additive does not unacceptably impact the ability of the first piece to be autogenously bonded to by the second molded piece. In various embodiments, the polyamide may provide at least 70, 80, 85, 90, or 95 percent by weight of first molded piece 2. (All disclosures herein of percentages of components of the first molded piece 2 and of the polyamide/ethylene-vinyl alcohol blend, are percentages of the organic polymeric components thereof; the presence of any inorganic material, e.g. mineral fillers, glass fibers or the like, is disregarded for such calculations.) In further embodiments, the polyamide may provide at most 97, 96, 93, 88, 83, or 75 percent by weight of first molded piece 2. Suitable nylons will be thermoplastic so that they can be molded, e.g. injection molded. Suitable polyamides may be chosen e.g. from products available form Du Pont (Wilmington, Del.) under the trade designation ZYTEL; products available from Toray Industries (Tokyo, Japan) under the trade designation AMILAN; products available from DSM (Herleen, Netherlands) under the trade designation AKULON; and products available from Ashley Polymers (Cranford, N.J.) under the trade designation ASHLENE.

First molded piece 2 also comprises ethylene-vinyl alcohol copolymer. The ethylene-vinyl alcohol copolymer may be present at any suitable weight percent. In various embodiments, the ethylene-vinyl alcohol copolymer may provide at least 2, 3, 4, 5, 7, 12, 15, 17, 20 or 25 percent by weight of first molded piece 2. In further embodiments, the ethylene-vinyl alcohol copolymer may provide at most 30, 28, 23, 18, 14, 10, 8, 6 or 5 percent by weight of first molded piece 2. The ethylene-vinyl alcohol copolymer may comprise any suitable composition; for example, the ethylene-vinyl alcohol copolymer may comprise at least 40, 50, 52, 55, 60, 65, 70, 75, or 80 mole percent of vinyl alcohol monomer units ($C_2H_4O$). The balance of the ethylene-vinyl alcohol copolymer will be ethylene monomer units ($C_2H_4$), except for e.g. a very low level of chain-end groups, initiator residues or the like. In further embodiments, the ethylene-vinyl alcohol copolymer may comprise at most 85, 83, 78, 73, 68, 63, 58, 56, or 54 mole percent of vinyl alcohol monomer units. Expressed on a weight basis, in various embodiments the ethylene-vinyl alcohol copolymer may comprise at least 60, 63, 66, 70, 74, 79, 83 or 86 weight percent of vinyl alcohol monomer units. In further embodiments, the ethylene-vinyl alcohol copolymer may comprise at most 90, 88, 85, 81, 77, 73, 69, 67, or 65 weight percent of vinyl alcohol monomer units. Blends of any of these copolymers may be used if desired. The ethylene-vinyl alcohol copolymer(s) may be any grade (e.g. in terms of melt flow properties) that is compatible with melt-blending with polyamide and molding, e.g. injection molding. Suitable ethylene-vinyl alcohol copolymers may be chosen e.g. from products available from Kuraray America (Houston, Tex.) under the trade designation EVAL, and products available from Chang Chun Petrochemicals (Taipei, Taiwan) under the trade designation EVASIN.

The percentage of vinyl alcohol monomer units in the ethylene-vinyl alcohol copolymer, and the weight percentage of the ethylene-vinyl alcohol copolymer in the polyamide blend, can be selected in combination to provide a desired level of vinyl alcohol monomer units in first molded piece 2. In various embodiments first molded piece 2 (again, disregarding e.g. any inorganic filler) of first molded piece 2 may comprise at least 2, 3, 4, 6, 8, 10, 12, 14, or 16 percent by weight of vinyl alcohol monomer units. In further embodiments first molded piece 2 may comprise at most 20, 17, 15, 13, 11, 9, 7, or 5 percent by weight of vinyl alcohol monomer units.

In some embodiments other materials, e.g. organic polymeric additives, may be present in the polyamide-ethylene-vinyl alcohol copolymer blend. Such additives may be present for any desired purpose, e.g. for impact modification, colorant carriers, or the like. In some embodiments, such additives will be present at a (total) level of less than 15, 10, 5, 2 or 1 percent by weight of the first molded piece 2. Regardless of the specific composition, first molded piece 2 is comprised of thermoplastic organic polymers at least as the major constituents thereof. That is, first molded piece 2 is obtained from a first precursor that is melted and molded as discussed in detail later herein.

Second molded piece 3 is a thermoset, hydrosilylation-cure silicone polymer. By this is meant that second molded piece 3 is the reaction product of a multipart (e.g. two-part) set of materials that are mixed with each other to form a second precursor that can be heated to promote curing (e.g. crosslinking) of the materials to form second molded piece 3. Thermoset, hydrosilylation-cure silicone materials are often supplied as a first part comprising polysiloxanes bearing vinyl groups, and a second part comprising polysiloxanes bearing silyl hydrides. A suitable catalyst (e.g. a platinum catalyst) is usually included with one of the parts (e.g. the part that comprises vinyl groups) although the catalyst can be added separately if desired. Such two-part silicone materials are often referred to as liquid silicone rubber (LSR) and by similar names. Each of the two parts may be chosen so as to impart the finished (crosslinked) product with desired chemical and physical properties, whether by manipulation of crosslink density, by including reinforcing additives such as e.g. fumed silica, and so on. Suitable thermoset, hydrosilylation-cure silicone materials may be chosen e.g. from products available DowDuPont (Midland, Mich.) under the trade designations SILASTIC and/or LC-x; products available from Wacker Chemie AG (Munich, Germany) under the trade designation ELASTO-SIL; products available from Momentive Performance Materials (Waterford, N.Y.) under the trade designation CLS, and products available from Shin-Etsu Chemical Co. (Tokyo, Japan) under the trade designations LIMS (Liquid Injection Molding System) and/or KE-x.

First piece 2 and second piece 3 may be made by any suitable molding process. In many convenient embodiments, the molding process may be injection molding. As noted, a first precursor of first molded piece 2 will be a thermoplastic material that can be taken at least to the melting point of its major constituents (disregarding any substantially unmeltable materials, e.g. mineral fillers, that might be present) to form a flowable mixture that is inserted into a mold. The first precursor is thus formed into a desired shape and at least partially solidified to form first piece 2. In some embodiments this may be performed in a first molding chamber with first piece 2 then being removed and placed in a second molding chamber to await the insertion of the second precursor of second piece 3. (Such a process is sometimes referred to as insert molding) In other embodiments first piece 2 may remain in the cavity in which it was molded and the second precursor of second piece 3 may be inserted into a remaining portion of the cavity. (Such a process is sometimes referred to as co-molding or multi-shot molding.) It is emphasized that dual-molding as disclosed herein encompasses any suitable variation of any such method.

First molded piece 2 may be made from any suitable polyamide blend as disclosed above. In many convenient embodiments, polyamide and ethylene-vinyl alcohol copolymer materials in solid form (e.g. as pellets) may be added together in the desired proportion to form a precursor to first molded piece 2. The pellets may be physically mixed to whatever extent necessary. Either of both of the materials may be dried or otherwise processed as needed for optimum behavior in the molding process. The precursor may be loaded into the hopper of a molding apparatus, e.g. an injection-molding apparatus. The precursor will then be conveyed into a melting chamber (e.g. a heated barrel) of the molding apparatus in which the polyamide and ethylene-vinyl alcohol copolymer solid materials are melted to form a molten, flowable material. It has been found that these materials, when melted in a molding apparatus, easily form a moldable molten blend. This being the case, in many embodiments it is not necessary for the polyamide and the ethylene-vinyl alcohol copolymer materials to be pre-compounded with each other (e.g., to be co-melted and mixed with each other) as a precursor step to being loaded into a molding apparatus. However, if first molded piece 2 is to exhibit a desired color, in some convenient embodiments the ethylene-vinyl alcohol copolymer material may be pre-compounded with any suitable colorant (e.g. a pigment or dye), at any colorant level that will impart the desired color to the final, molded piece.

The first precursor to first piece 2 (the polyamide blend) being a thermoplastic material, it will be maintained at a temperature that is sufficiently high to maintain the blend in a molten, flowable state during insertion of the first precursor into a molding chamber. The molding chamber may be held at any appropriate temperature prior to and during the insertion of the first precursor into the molding chamber. Once the first precursor is inserted, the chamber walls may be cooled at any suitable rate and to any suitable temperature that is appropriate to solidify the first precursor into first piece 2. (The above descriptions will make it clear that the term molding generally encompasses the steps of melting a precursor, shaping the precursor into a desired shape, and solidifying the shaped precursor into a molded piece.) The first molded piece 2 may then be left in the molding chamber to await insertion of the precursor to the second molded piece, or may be moved to a different molding chamber to await insertion of the second precursor into that molding chamber.

Second molded piece 3 may be made from any suitable thermosettable, hydrosilylation-cure silicone material as discussed in detail above. Also as noted above, many such materials are provided as a two-part mixture to be mixed e.g. at a 1:1 ratio or at a 10:1 ratio. Typically, both parts are miscible liquids which can be easily mixed together to form the second precursor to the second molded piece 3. (Either of both of the liquid parts may be degassed or otherwise processed for optimum behavior in the molding process.) The second precursor can then be inserted as a flowable liquid into the molding chamber with the first molded piece present therein. The molding chamber is controlled to a desired elevated temperature to promote the curing reaction (of silyl hydrides moities with vinyl moities); the chamber may be held at this temperature for any appropriate length of time. First molded piece 2 being a thermoplastic material, the time-temperature exposure of first molded piece 2 during this second molding operation will be controlled to ensure that first molded piece 2 does not unacceptably melt, sag, deform or the like. In specific embodiments, the molding chamber may be controlled to a temperature that ensures that no portion of first molded piece 2 comes within 30, 40, 50, 60 or 70 degrees C. of the melting point of a major constituent (e.g. the polyamide) of first molded piece 2. During the process of molding the second precursor to form the second molded piece 3, a portion of the second precursor will be in contact with a portion 5 of a surface of the first molded piece 2. Autogenous bonding of the second precursor with portion 5 of the surface of first molded piece 2 will occur during the process of curing the second precursor to form second molded piece 3. Thus, an autogenous bond will be formed between surface portions 5 and 6 of the first and second molded pieces, at interface 4 therebetween. After the curing of the silicone material (and formation of an autogenous bond between surface portions 5 and 6 of first and second pieces 2 and 3) has been completed to a sufficient extent, the chamber can be cooled to a desired temperature and the mold opened to remove the thus-formed silicone-polyamide composite article 1. (Some additional of curing of the silicone and/or strengthening of the autogenous bond may continue at a low level for some time, even after the article is removed from the mold.)

The process outlined above thus produces a dual-molded silicone-polyamide composite article in which a portion of a surface of the second molded piece is autogeneously bonded to a portion of a surface of the first molded piece. The dual-molding process can be repeated as necessary to produce any desired number of composite articles.

The present work has revealed that including an appropriate amount of ethylene-vinyl alcohol copolymer in the material that is used to form the first molded piece 2, can significantly enhance the strength of the autogenous bond that is developed between the second (silicone-based) molded piece 3 and the first (polyamide-based) molded piece 2. In particular, the presence of the ethylene-vinyl alcohol copolymer allows this autogenous bond to withstand exposure to water under demanding circumstances (e.g. upon exposure to high-temperature flowing liquid water and to high-temperature water vapor). For example, as evidenced in the Examples herein, it has been found that the presence of ethylene-vinyl alcohol copolymer can enable the first and second molded pieces of the dual-molded article to remain securely bonded to each other even after the bonded pieces have been subjected to multiple (e.g., dozens) of wash cycles in a dishwasher. In comparison, similar dual-molded articles in which the first molded piece did not include any ethylene-vinyl alcohol copolymer often could be separated from each other with a minimum of force (e.g. by hand with trivial effort) even before being subjected to a dishwasher exposure.

Dual-molded silicone-polyamide composite article 1 can have any desired shape and size and can be used for any desired purpose. In contrast to the generic, representative illustration of FIG. 1, the interface 4 between the autogenously-bonded surface portions 5 and 6 of first and second molded pieces 2 and 3 does not have to exhibit a simple, e.g. planar, configuration. Rather, the interface may be complex, with multiple faces, angles, and so on. In particular embodiments, surface portion 5 of first molded piece 2 may be configured with texture, with multiple dead-end cavities and/or through-holes, into or through which the second precursor may penetrate. Such arrangements may further enhance the strength of the bond between the first and second molded pieces.

In some embodiments, first molded piece 2 may be a relative hard and rigid item (e.g. with a Shore D hardness of at least 50, 60, 70 or 80), with second molded piece 3 being a relatively soft and flexible item (e.g. with a Shore A hardness of at most 70, 60, 50, 40 or 30). In many embodiments, second molded piece 3 may serve as a resilient item that provides e.g. a cushioning, gasketing, or sealing function for first molded piece 2.

In some particular embodiments, first and second molded pieces 2 and 3 may be components of a respirator. An illustrative respirator 10 is shown in exemplary embodiment in FIG. 2. The term "respirator" means a personal respiratory protection device that is worn by a person to filter air before the air enters the person's respiratory system. This term encompasses e.g. full face respirators, half mask respirators, powered air purifying respirators, and self contained breathing apparatus. The illustrated respirator 10 includes a facepiece 11 that supports any number and type of respiratory protection elements including, for example, one or more chemical or particulate filtration cartridge 28. Facepiece 11 may also comprise one or more inhalation valves and/or exhalation valves, as well as one or more straps 34 configured to secure the facepiece 11 of respirator 10 to a user's head.

Figure 2:
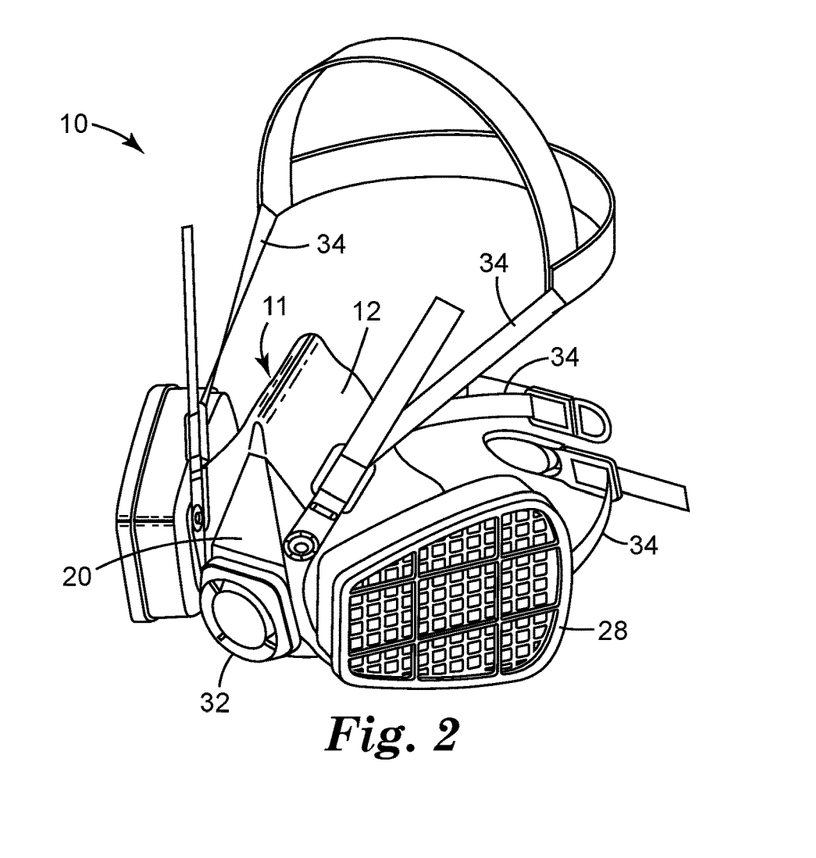
FIG. 2 is a perspective view of an exemplary respirator.
Figure 3:
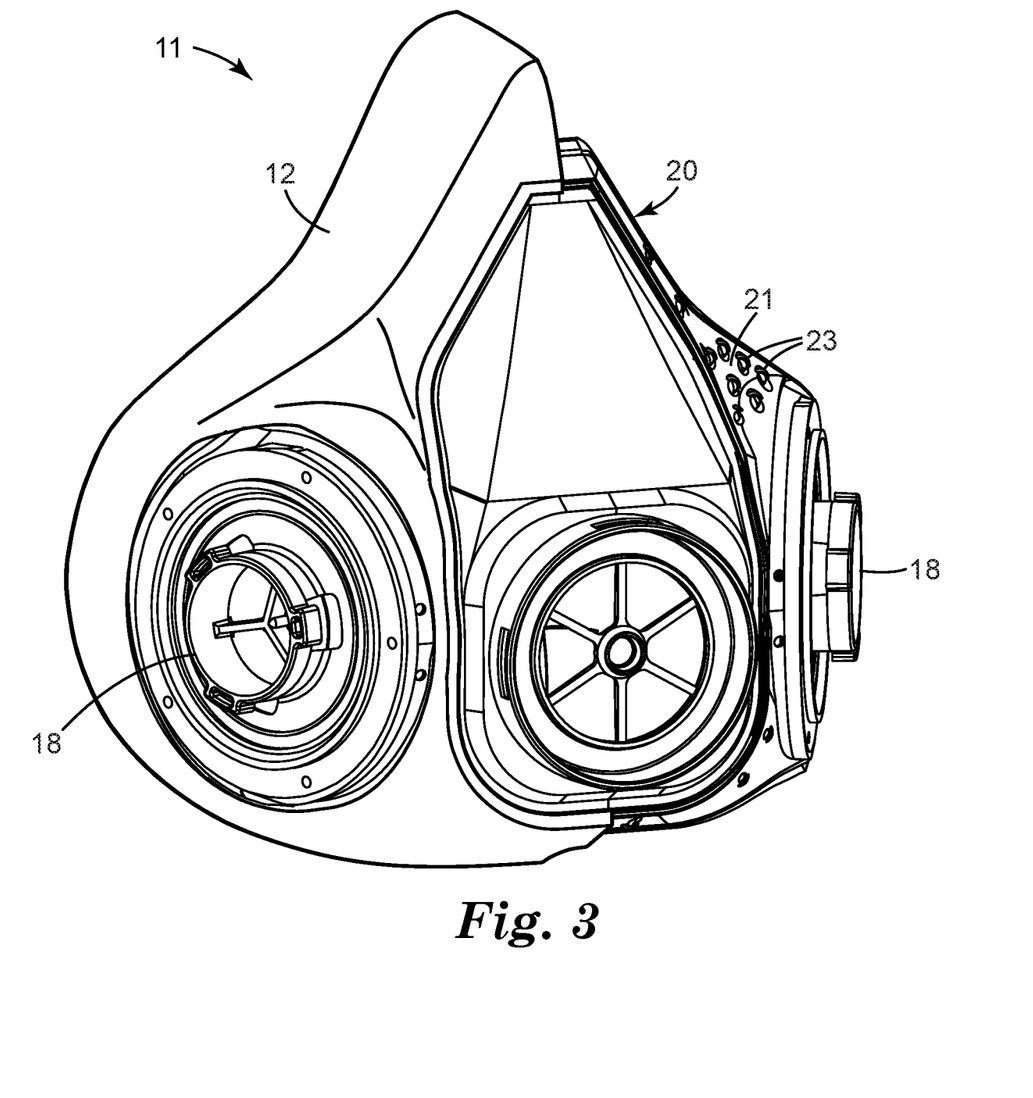
FIG. 3 is a perspective view of an exemplary facepiece body and an exemplary sealing element of a respirator.

Such a respirator 10 may often comprise a facepiece 11 that comprises a relatively rigid facepiece body 20 (as seen in greater detail in FIG. 3) to which is attached a sealing element 12 (most easily seen in FIG. 3, noting that sealing element 12 is shown in FIG. 3 in partial cutaway for ease of presentation). The facepiece body 20 may provide mechanical integrity and may support the various respirator protection elements (e.g. filter cartridges), while the sealing element 12 may serve e.g. as a face seal that compliantly and resiliently seals against the face of a wearer of the respirator. The facepiece body 20 may comprise one or more inlets 18 to which a filter cartridge may be fluidly coupled (and which may comprise inhalation valves), and one or more outlets (which may comprise an exhalation valve 32).

In some embodiments, first molded piece 2 may serve as a facepiece body 20 of a respirator 10 and second molded piece 12 may serve as a sealing element of the respirator 10, with sealing element 12 being autogenously bonded to facepiece body 20. In various embodiments, first molded piece 2 may thus comprise any or all of inlets, outlets, inhalation valves, exhalation valves, and so on as desired for any particular respirator. In some embodiments, one or more apertures 23 may be provided in portion 21 (corresponding to the above-described surface portion 5) of the surface of facepiece body 20 to which sealing element 12 is to be bonded. During the molding of sealing element 12, the second precursor may flow into and/or through the one or more apertures 23 and may thus form a mechanical interlock between sealing element 12 and facepiece body 20. (Similar effects may be achieved by providing this surface portion of facepiece body 20 with protrusions around which the second precursor can flow.)

In at least some embodiments, sealing element 12 may provide a face seal as noted above. Such a face seal can acceptably minimize or prevent any penetration of unfiltered air from reaching an interior space between the respirator and the wearer's face. Such a face seal may include an in-turned cuff or flange that further enhances the resiliency with which the face seal contacts a wearer's face. In some embodiments, sealing element 12 may serve another purpose, either instead of, or in addition to, providing a face seal. Specifically, a portion of sealing element 12 may be positioned proximate an inlet of facepiece body 20; such a portion may be configured to provide a resilient gasket between facepiece body 20 and a filter cartridge 28 that is fluidly coupled to an inlet of facepiece body 20.

List of Exemplary Embodiments

Embodiment 1 is a dual-molded silicone-polyamide composite article comprising: a first molded piece that comprises a blend of polyamide and an ethylene-vinyl alcohol copolymer in which vinyl alcohol monomer units of the ethylene-vinyl alcohol copolymer provide from 2 to 20 weight percent of the blend; and, a second molded piece that comprises a thermoset, hydrosilylation-cure silicone polymer, wherein a portion of a surface of the second molded piece is autogenously bonded to a portion of a surface of the first molded piece.

Embodiment 2 is the dual-molded article of embodiment 1 wherein the ethylene-vinyl alcohol copolymer comprises at least 60 weight percent vinyl alcohol monomer units.

Embodiment 3 is the dual-molded article of any of embodiments 1-2 wherein the ethylene-vinyl alcohol copolymer comprises at most 85 weight percent vinyl alcohol monomer units.

Embodiment 4 is the dual-molded article of any of embodiments 1-3 wherein the blend comprises from 3 to 23 weight percent ethylene-vinyl alcohol copolymer.

Embodiment 5 is the dual-molded article of any of embodiments 1-3 wherein the blend comprises from 4 to 18 weight percent ethylene-vinyl alcohol copolymer.

Embodiment 6 is the dual-molded article of any of embodiments 1-5 with the proviso that the portion of the surface of the first molded piece to which the portion of the surface of the second molded piece is autogenously bonded, does not comprise an adhesion-promoting surface treatment.

Embodiment 7 is the dual-molded article of any of embodiments 1-6 with the proviso that the portion of the surface of the first molded piece to which the portion of the surface of the second molded piece is autogenously bonded, does not comprise a silane coupling agent surface treatment.

Embodiment 8 is the dual-molded article of any of embodiments 1-7 wherein the first molded piece and the second molded piece are components of a facepiece of a respirator.

Embodiment 9 is the dual-molded article of embodiment 8 wherein the first molded piece is a facepiece body of the respirator facepiece.

Embodiment 10 is the dual-molded article of any of embodiments 8-9 wherein the second molded piece comprises a sealing element a portion of which is configured to contact the face of a wearer of the respirator in order to provide a face seal of the respirator facepiece.

Embodiment 11 is the dual-molded article of any of embodiments 9-10 wherein the second molded piece comprises a sealing element a portion of which is configured to provide a gasket between the facepiece body and a filter cartridge that is fluidly coupled to the facepiece body.

Embodiment 12 is the dual-molded article of any of embodiments 1-11 wherein the polyamide is chosen from the group consisting of nylon 66, nylon 6, nylon 510, nylon 16, nylon 11, and nylon 12, and copolymers or blends thereof.

Embodiment 13 is the dual-molded article of any of embodiments 1-12 wherein the polyamide and the ethylene-vinyl alcohol copolymer collectively provide at least 95 weight percent of the first molded piece.

Embodiment 14 is a method of making a dual-molded silicone-polyamide composite article, the method comprising: molding a blend of polyamide and ethylene-vinyl alcohol copolymer to form a first molded piece; then, molding a thermoset, hydrosilylation-cure silicone material to form a second molded piece while a portion of a surface of the silicone material is in contact with a portion of a surface of the first molded piece; wherein the ethylene-vinyl alcohol copolymer comprises hydroxyl-bearing monomer units that provide from 2 to 20 weight percent of the blend, and wherein during the molding of the silicone material the portion of the surface of the silicone material that is in contact with the portion of the surface of the first molded piece forms an autogenous bond with the portion of the surface of the first molded piece, so that the first and second molded pieces, as produced by the molding process, form a silicone-polyamide composite article.

Embodiment 15 is the method of embodiment 14 wherein the molding of the blend is performed in a first injection-molding chamber, and wherein the first molded piece is removed from the first injection-molding chamber and is inserted into a second injection-molding chamber, after which the silicone material is injected into the second injection-molding chamber to form the second molded piece.

Embodiment 16 is the method of any of embodiments 14-15 wherein the blend is provided by melt-blending the polyamide and the ethylene-vinyl alcohol copolymer with each other in an injection-molding apparatus, with the proviso that the polyamide and the ethylene-vinyl alcohol copolymer are not pre-compounded with each other before being delivered to the injection-molding apparatus.

Embodiment 17 is the method of any of embodiments 14 and 16 wherein the molding of the blend is performed in a first injection-molding chamber, and wherein the first molded piece remains in the first injection-molding chamber and the silicone material is injected into the first injection-molding chamber to form the second molded piece.

Embodiment 18 is the method of any of embodiments 14-17 wherein the polyamide and the ethylene-vinyl alcohol copolymer are thermoplastic resins and wherein the molding of the blend of polyamide and ethylene-vinyl alcohol copolymer to form the first molded piece includes a step of cooling the blend to solidify the blend as the first molded piece.

Embodiment 19 is the method of any of embodiments 14-18 wherein the molding of the silicone material to form the second molded piece includes a step of heating the silicone material to solidify the silicone material as the second molded piece.

Embodiment 20 is the method of embodiment 19 with the proviso that the step of heating the silicone material to solidify the silicone material as the second molded piece does not raise a temperature of any portion of the first molded piece to within 50 degrees C. of a melting point of the first molded piece.

Embodiment 21 is the method of any of embodiments 14-20 wherein the method includes a step of pre-compounding a colorant into that ethylene-vinyl alcohol copolymer before the ethylene-vinyl alcohol copolymer is blended with the polyamide.

Embodiment 22 is the article of any of embodiments 1-13 made by the method of any of embodiments 14-21.

Examples

Molding of Polyamide/Ethylene-Vinyl Alcohol Blend

Polyamide (Nylon 66) was obtained from DowDuPont, Midland, Mich., under the trade designation MT409. Various grades of ethylene-vinyl alcohol copolymer (EVOH) were obtained from Kuraray America (Houston, Tex.) under the trade designation EVAL. The grades were LT174B (27 mole percent ethylene monomer units), F171B (32 mole percent ethylene monomer units) and G176B (48 mole percent ethylene monomer units).

The polyamide and the EVOH were manually dry blended and were then loaded into a hopper of a conventional injection molding apparatus. The extrusion barrel of the apparatus was held at a nozzle temperature of 540° F.; the injection mold was held at 180° F. Molding cycle time was on the order of a few (e.g. 4-5) seconds. The injection molding process was used to mold elongate coupons that were roughly rectangular in shape. Each molded coupon was removed from the injection molding cavity and was then placed into a cavity of a second molding apparatus in order to have a silicone material molded in contact with the coupon.

Molding of Two-Part Silicone

A two-part, hydrosilylation-cure silicone rubber precursor was obtained from Momentive Performance Materials (Waterford, N.Y.) under the trade designation CLS 360. The two parts were metered into a mixing barrel and traveled from there into an injection barrel, which was water cooled to prevent any premature reaction of the silicone materials. The mixed silicone materials were injected into the cavity containing the previously-molded coupon, with the injection mold held in the range of 340-380° F. Molding cycle time was on the order of 45-55 seconds.

The molding cavity of the second (silicone) molding apparatus was sized and shaped so that the silicone material was cured into an approximate "S" (cobra) shape, with a portion of the lower surface of the lower (horizontal) portion of the S-shaped piece being in contact with a forward portion of the upper surface of the polyamide coupon.

Dishwasher Treatment

A convenient number of samples (e.g. 10-15, each sample comprising a polyamide-blend coupon with an S-shaped silicone piece bonded thereto) were grouped together using a zip tie and put into a commercial dishwasher. The dishwasher was then loaded with reagents of the sort customarily used in the cleaning of respirator components; specifically, a detergent, a disinfecting agent, and a rinse agent. All reagents were commercially available, widely used products. Each batch of samples was subjected to a large number of dishwasher cycles (typically, 200 cycles). Each cycle was approximately one hour; the temperature of the water was estimated to be about 120-135° F. The dishwasher reagents (rinse agent, detergent and disinfectant) were replenished every 30-40 cycles, or as needed.

Mechanical Testing

The bond between the molded silicone piece and the polyamide blend coupon was evaluated by measuring the force required to separate the molded silicone piece from the polyamide blend coupon. The testing was done using a mechanical testing apparatus (e.g. an Instron or equivalent mechanical testing apparatus). The polyamide blend coupon was held by a first grip of the mechanical testing apparatus. The upper horizontal portion of the "S"-shaped silicone piece was held by a second grip of the mechanical testing apparatus. The first and second grips were pulled away from each other; the sample configuration was such that the test amounted to an approximately 90° peel test. The testing speed was 500 millimeters per minute; the test was run at room temperature with a suitably sized load cell (typically, 1 kN). The force required to separate the silicone piece from the polyamide blend coupon was recorded. For each example, at least 10 samples were tested and an average value reported. Samples that had not been exposed to the dishwasher treatment, and those that had been exposed to the dishwasher treatment, were tested.

Comparative Example samples were also tested, which had been prepared in similar manner to the above procedure except with a first molded piece comprised only of polyamide rather than being a polyamide/ethylene vinyl alcohol copolymer blend. The Comparative Example samples were not exposed to the above-described dishwasher treatment. Results are recorded in Table 1.

In Table 1, "Wt. % EVOH" is the weight percent of the ethylene-vinyl alcohol copolymer in the first molded piece (as a percentage of the total weight of the piece). "Mole % E" is the mole percent of ethylene units in the ethylene-vinyl alcohol copolymer, as reported by the manufacturer. Separation force is reported in Newtons.

TABLE 1

| Example | Wt. % EVOH | Mole % E | Dishwasher Treated | Separation Force (N) |
|---|---|---|---|---|
| Comparative | 0 | — | No | 12 |
| L-15-27 | 15 | 27 | No | 384 |
| | | | Yes | 313 |
| L-5-27 | 5 | 27 | No | 400 |
| | | | Yes | 300 |
| F-15-32 | 15 | 32 | No | 297 |
| | | | Yes | 185 |
| F-5-32 | 5 | 32 | No | 300 |
| | | | Yes | 15 |
| G-15-48 | 15 | 48 | No | 270 |
| | | | Yes | 230 |
| G-5-48 | 5 | 48 | No | 360 |
| | | | Yes | 40 |

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A dual-molded silicone-polyamide composite article comprising:
   a first molded piece that comprises a blend of polyamide and an ethylene-vinyl alcohol copolymer in which the ethylene-vinyl alcohol copolymer comprises at least 60 weight percent vinyl alcohol monomer units, with vinyl alcohol monomer units of the ethylene-vinyl alcohol copolymer providing from 2 to 20 weight percent of the blend and with the polyamide providing at least 70 percent by weight of the first molded piece;
   and,
   a second molded piece that comprises a thermoset, hydrosilylation-cure silicone polymer,
   wherein a portion of a surface of the second molded piece is autogenously bonded to a portion of a surface of the first molded piece;
   and,
   wherein the polyamide is chosen from the group consisting of nylon 66, nylon 6, and copolymers and blends thereof.

2. The dual-molded article of claim 1 wherein the ethylene-vinyl alcohol copolymer comprises at most 85 weight percent vinyl alcohol monomer units.

3. The dual-molded article of claim 1 wherein the blend comprises from 4 to 18 weight percent ethylene-vinyl alcohol copolymer.

4. The dual-molded article of claim 1 with the proviso that the portion of the surface of the first molded piece to which the portion of the surface of the second molded piece is autogenously bonded, does not comprise an adhesion-promoting surface treatment.

5. The dual-molded article of claim 1 with the proviso that the portion of the surface of the first molded piece to which the portion of the surface of the second molded piece is autogenously bonded, does not comprise a silane coupling agent surface treatment.

6. The dual-molded article of claim 1 wherein the first molded piece and the second molded piece are components of a facepiece of a respirator.

7. The dual-molded article of claim 6 wherein the first molded piece is a facepiece body of the respirator facepiece.

8. The dual-molded article of claim 7 wherein the second molded piece comprises a sealing element a portion of which is configured to contact the face of a wearer of the respirator in order to provide a face seal of the respirator facepiece.

9. The dual-molded article of claim 7 wherein the second molded piece comprises a sealing element a portion of which is configured to provide a gasket between the facepiece body and a filter cartridge that is fluidly coupled to the facepiece body.

10. The dual-molded article of claim 1 wherein the polyamide and the ethylene-vinyl alcohol copolymer collectively provide at least 95 weight percent of the first molded piece.

11. A method of making the a dual-molded silicone-polyamide composite article of claim 1, the method comprising:
   molding a blend of polyamide and ethylene-vinyl alcohol copolymer to form a first molded piece;
   then,
   molding a thermoset, hydrosilylation-cure silicone material to form a second molded piece while a portion of a surface of the silicone material is in contact with a portion of a surface of the first molded piece;
   wherein the ethylene-vinyl alcohol copolymer comprises at least 60 weight percent vinyl alcohol monomer units,
   wherein the ethylene-vinyl alcohol copolymer comprises hydroxyl-bearing monomer units that provide from 2 to 20 weight percent of the blend,
   wherein the polyamide provides at least 70 percent by weight of the first molded piece,
   and wherein during the molding of the silicone material the portion of the surface of the silicone material that is in contact with the portion of the surface of the first molded piece forms an autogenous bond with the portion of the surface of the first molded piece, so that the first and second molded pieces, as produced by the molding process, form a silicone-polyamide composite article.

12. The method of claim 11 wherein the molding of the blend is performed in a first injection-molding chamber, and wherein the first molded piece is removed from the first injection-molding chamber and is inserted into a second injection-molding chamber, after which the silicone material is injected into the second injection-molding chamber to form the second molded piece.

13. The method of claim 11 wherein the blend is provided by melt-blending the polyamide and the ethylene-vinyl alcohol copolymer with each other in an injection-molding apparatus, with the proviso that the polyamide and the ethylene-vinyl alcohol copolymer are not pre-compounded with each other before being delivered to the injection-molding apparatus.

14. The method of claim 11 wherein the molding of the blend is performed in a first injection-molding chamber, and wherein the first molded piece remains in the first injection-molding chamber and the silicone material is injected into the first injection-molding chamber to form the second molded piece.

15. The method of claim 11 wherein the polyamide and the ethylene-vinyl alcohol copolymer are thermoplastic resins and wherein the molding of the blend of polyamide and ethylene-vinyl alcohol copolymer to form the first molded piece includes a step of cooling the blend to solidify the blend as the first molded piece.

16. The method of claim 11 wherein the molding of the silicone material to form the second molded piece includes a step of heating the silicone material to solidify the silicone material as the second molded piece.

17. The method of claim 16 with the proviso that the step of heating the silicone material to solidify the silicone material as the second molded piece does not raise a temperature of any portion of the first molded piece to within 50 degrees C. of a melting point of the first molded piece.

18. The method of claim 11 wherein the method includes a step of pre-compounding a colorant into that ethylene-vinyl alcohol copolymer before the ethylene-vinyl alcohol copolymer is blended with the polyamide.

19. The dual-molded article of claim 1 wherein the polyamide exhibits an observable melting point.

* * * * *

UNITED STATES PATENT AND TRADEMARK OFFICE
CERTIFICATE OF CORRECTION

PATENT NO. : 12,173,153 B2
APPLICATION NO. : 17/047493
DATED : December 24, 2024
INVENTOR(S) : Ramnath Subramaniam et al.

It is certified that error appears in the above-identified patent and that said Letters Patent is hereby corrected as shown below:

In the Claims

<u>Column 12</u>
Line 45 In Claim 11, delete "making the a dual-molded" and insert -- making the dual-molded --, therefor.

Signed and Sealed this
Sixth Day of May, 2025

Coke Morgan Stewart
*Acting Director of the United States Patent and Trademark Office*